United States Patent
Kim et al.

(10) Patent No.: US 7,268,886 B2
(45) Date of Patent: Sep. 11, 2007

(54) METHOD AND APPARATUS FOR SIMULTANEOUSLY MEASURING DISPLACEMENT AND ANGULAR VARIATIONS

(75) Inventors: Jae Wan Kim, Daejeon (KR); Tae Bong Eom, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 411 days.

(21) Appl. No.: 10/874,352

(22) Filed: Jun. 24, 2004

(65) Prior Publication Data
US 2005/0157310 A1      Jul. 21, 2005

(30) Foreign Application Priority Data
Jan. 16, 2004      (KR)  ............... 10-2004-0000734

(51) Int. Cl.
    *G01B 9/02*      (2006.01)
(52) U.S. Cl. .................. 356/492; 356/73; 356/493
(58) Field of Classification Search ............... 356/487, 356/490, 495, 500, 72, 73, 491–493, 498, 356/508, 510
See application file for complete search history.

(56) References Cited

U.S. PATENT DOCUMENTS 6,252,667 B1 *   6/2001   Hill et al. ................. 356/487
7,016,050 B2 *   3/2006   Farrell et al. ............. 356/510

OTHER PUBLICATIONS

Verification of the sub-nanometric capability of an NPL differeential plane mirror interferometer with a capacitance probe, Downs et al, Measurement Science and Technology, 1998, pp. 1437-1440.*

* cited by examiner

*Primary Examiner*—Samuel A. Turner
(74) *Attorney, Agent, or Firm*—Bacon & Thomas, PLLC

(57) ABSTRACT

Disclosed herein is a method and apparatus for simultaneously measuring a displacement and angular variations. The method and apparatus of the present invention allows light radiated from a single light source to be placed along a light axis so as to simultaneously measure a distance (displacement) and angular variations that are different physical quantities, so that the displacement and angular variations of the measuring device of a precision measuring apparatus or machining device of a machine tool moved by a stage can be simultaneously measured without an Abbe error.

9 Claims, 7 Drawing Sheets ated direction while passing through the quarter wave plate 103 again, passes through the polarizing beam splitter 102 and is projected on a linear polarizer 107. This S-polarized light is converted into linear polarized light having both an S-polarized light component and a P-polarized light component by the linear polarizer 107 placed at an

METHOD AND APPARATUS FOR SIMULTANEOUSLY MEASURING DISPLACEMENT AND ANGULAR VARIATIONS

BACKGROUND OF THE INVENTION

1. Field of the Invention

The present invention relates to a method and apparatus for simultaneously measuring a displacement and angular variations, which allows light radiated from a single light source to be placed along a light axis so as to simultaneously measure a distance (displacement) and angular variations that are different physical quantities, so that the displacement and angular variations of the measuring device of a precision measuring apparatus or machining device of a machine tool moved by a stage can be simultaneously measured without an Abbe error.

2. Description of the Related Art

In general, a precision measuring apparatus or machine tool is equipped with a stage to move a measuring device or machining device to a desired location. When the stage is operated, the stage undergoes a rectilinear movement in a driving-axis direction and a rotation movement (yaw or pitch) in two directions perpendicular to the driving-axis direction. The performance of the stage depends on the extent to which the stage moves accurately and rectilinearly without a rotation movement.

Accordingly, an apparatus for measuring a positional variation (displacement) in the driving-axis direction and angular variations in two perpendicular directions is required to accurately operate the stage and improve the performance of the stage. Since both the displacement and the angular variations cannot be simultaneously measured with a single conventional apparatus, various types of measuring apparatuses have been simultaneously used to measure the displacement and the angular variations.

FIG. 1 is a schematic diagram showing a Michelson interferometer for measuring a displacement.

The P-polarized light of light radiated from a light source 101 is reflected by a polarizing beam splitter 102, passes through a quarter wave plate 105 and then is projected on a reference mirror 106. In contrast, the S-polarized light of the light passes through the polarizing beam splitter 102 and a quarter wave plate 103 and is projected on a stage mirror 104 moving along with a stage.

The P-polarized light, which is linear polarized light and was projected on the reference mirror 106 through the quarter wave plate 105 in the form of circular polarized light, is converted into S-polarized light having a perpendicularly converted direction while passing through the quarter wave plate 105 again, passes through the polarizing beam splitter 102 and is projected on a linear polarizer 107. This S-polarized light is converted into linear polarized light having both an S-polarized light component and a P-polarized light component by the linear polarizer 107 placed at an angle of 45°, and is projected on a photo diode 108 to be used as reference light to measure a distance.

The S-polarized light, which is circular polarized light and was projected on the stage mirror 104 through the quarter wave plate 103 in the form of circular polarized light, is reflected by the stage mirror 104, converted into P-polarized light having a perpendicularly converted direction while passing through the quarter wave plate 103 again, and then reflected by the polarizing beam splitter 102. This P-polarized light is converted into linear polarized light having both S-polarized light and P-polarized light while passing through the linear polarizer 107 placed at an angle of 45°, and is projected on the photo diode 108 to be used as light to measure a distance.

Accordingly, a signal processing circuit (not shown) and a computer (not shown) connected to the photo diode 108 analyze the phase difference between the light reflected by the reference mirror 106 and the light reflected by the stage mirror 104, and thus can calculate the distance along which the measuring device of the measuring apparatus or the machining device of the machine tool has moved with the aid of the stage.

Since the laser interferometer measures a displacement in the wavelengths of light, it can precisely measure the displacement at a nanometer level, but cannot measure an angular variation. As occasion demands, both a displacement and an angular variation in a single direction can be simultaneously measured by a modified laser interferometer, but cannot measure a displacement and two angular variations in two directions.

FIG. 2 is a schematic diagram showing the principle of an autocollimator for precisely measuring angular variations.

A part of light radiated from a light source 201 through a pin hole 202 passes through a beam splitter 203, is converted into a collimated beam while passing through a lens 204, and then is projected on a stage mirror 205. The remaining part of the light is reflected by the beam splitter 203 (not shown).

A part of the light which is projected on and reflected by a stage mirror is reflected by the beam splitter 203 and is projected on a position sensitive detector 206, while the remaining part of the light passes through the beam splitter 203 and is projected on the light source 201 (not shown). In this case, the part of the light projected on the position sensitive detector is focused on a single point to allow the incident position thereof to be accurately detected.

Accordingly, a signal processing circuit (not shown) and a computer (not shown) connected to the position sensitive detector 206 analyzes the position of the light projected on the position sensitive detector 206, and thus can calculate the angular variations of the measuring device of the precision measuring apparatus or machining device of the machine tool moved by a stage, in two directions.

The above-described autocollimator is a device for precisely measuring small angular variations. The autocollimator can measure angular variations (yaw and pitch directions), but cannot measure a distance.

Therefore, to measure both a displacement and angular variations, both a laser interferometer and an autocollimator should be employed. However, when a displacement and angular variations are measured by different apparatuses, axes on which two different physical quantities are measured become different and thus an Abbe error occurs, limiting measuring capability. Furthermore, to simultaneously measure a displacement and angular variations by different apparatuses, an additional apparatus is required, and thus costs for measuring the displacement and the angular variations are increased.

SUMMARY OF THE INVENTION

Accordingly, the present invention has been made keeping in mind the above problems occurring in the prior art, and an object of the present invention is to provide a method and apparatus for simultaneously measuring a displacement and angular variations, which is capable of simultaneously measuring the displacement of a stage mirror attached to a stage that moves the measuring device or machining device, and the angular variations of two directions in a precision measuring apparatus or machining device, and the like.

Another object of the present invention is to provide a method and apparatus for preventing an Abbe error, which is capable of preventing an Abbe error from occurring between two light axes by setting a light axis for measuring the displacement of a stage mirror attached to a stage that moves the measuring device or machining device and a light axis for measuring the angular variations of the stage on the same rectilinear line in a precision measuring apparatus or machining device, and the like.

Still another object of the present invention is to provide an apparatus for simultaneously measuring a displacement and angular variations, which is capable of performing both the function of a conventional laser interferometer for measuring a displacement and the function of a conventional autocollimator for measuring angular variations, thus simplifying a structure of the compound measurement apparatus.

Still another object of the present invention is to provide an apparatus for simultaneously measuring a displacement and angular variations, which is capable of maintaining the displacement measurement resolution of a conventional laser interferometer and the angular variation measurement resolution of a conventional autocollimator while simultaneously measuring the displacement of a stage mirror attached to a stage that moves the measuring device or machining device and the angular variations of the stage in a precision measuring apparatus or machining device, and the like.

In order to accomplish the above objects, the present invention provides a method of simultaneously measuring a displacement and angular variations, including the steps of allowing light radiated from a single light source to be projected along a single light axis on a stage mirror attached to a stage that moves a measuring device of a precision measuring apparatus or machining device of a machine tool; and simultaneously measuring a displacement and angular variations of the measuring device or the machining tool by an interferometer for comparing light reflected by the stage mirror with light split from the light radiated from the single light source and reflected by the reference mirror and analyzing them, and an autocollimator for analyzing an incident position of the light reflected by the mirror.

In addition, the present invention provides a method of simultaneously measuring a displacement and angular variations, including the first step of allowing light radiated from a single source to function as a point light source while passing through a pin hole, and then allowing a part of light radiated from the point light source to be projected on a polarizing beam splitter through a beam splitter; the second step of causing P-polarized light out of S-polarized and P-polarized light component of the light from the light source, which has been reflected by the polarizing beam splitter, to be converted into S-polarized light while being projected on and being reflected by a reference mirror through a quarter wave plate, causing the S-polarized light to be converted into reference light having both S-polarized light component and P-polarized light component by a first polarization rotating element while passing through the polarizing beam splitter and the first polarization rotating element, and then allowing the reference light to be projected on a photo diode; the third step of causing S-polarized light out of S-polarized light and P-polarized light in the first step, which has been passed through the polarizing beam splitter to be converted, into light having both an S-polarized light component and a P-polarized light component by a second polarization rotating element while being projected on and reflected by a stage mirror, which moves along with a stage, through the second polarization rotating element, and then allowing the light to be projected on the polarizing beam splitter again; the fourth step of causing P-polarized light out of S-polarized light and P-polarized light obtained through the second polarization rotating element, which has been reflected by the polarizing beam splitter, to be converted into light having both an S-polarized light component and a P-polarized light component by a second polarization rotating element, and then allowing the light to be projected on a photo diode to be used as light for measuring the displacement; the fifth step of causing a part of S-polarized light out of S-polarized light and P-polarized light obtained through the second polarization rotating element, which has been passed through the polarizing beam splitter, to pass through a lens and be reflected by the beam splitter, and then allowing the light to be projected on a position sensitive detector to be used as light for measuring the angular variations; and the sixth step of measuring the displacement of the measuring device or machining device moved by the stage by analyzing a phase difference between the reference light projected on the photo diode and the light for measuring the displacement, and measuring the angular variations of the measuring device or machining device in two directions by analyzing a position of the light projected on the position sensitive detector.

In addition, the present invention provides a method of simultaneously measuring a displacement and angular variations, including the first step of allowing light radiated from a single source to function as a point light source while passing through a pin hole, and allowing a part of light radiated from the point light source to be projected on a polarizing beam splitter through a beam splitter; the second step of causing P-polarized light out of S-polarized light and P-polarized light, which has been reflected by the polarizing beam splitter, to be converted into reference light having both an S-polarized light component and a P-polarized light component by a first polarization rotating element while being returned from a first corner cube, being reflected by the polarizing beam splitter again and passing through the first polarization rotating element, and then allowing the reference light to be projected on a photo diode; the third step of causing S-polarized light out of S-polarized light and P-polarized light, which has been passed through the polarizing beam splitter, to be converted into light having both an S-polarized light component and a P-polarized light component by a second polarization rotating element while being projected on and reflected by a stage mirror, which moves along with a stage, through the second polarization rotating element, and then allowing the light to be projected on the polarizing beam splitter again; the fourth step of causing P-polarized light out of S-polarized light and P-polarized light obtained through the second polarization rotating element, which has been reflected by the polarizing beam splitter, to be converted into S-polarized light while being returned from a second corner cube, being reflected by the polarizing beam splitter, and being projected on and reflected by a stage mirror through a quarter wave plate, causing the S-polarized light to be converted into light having both an S-polarized beam component and a P-polarized beam component by the first polarization rotating element while passing through the polarizing beam splitter and the first polarization rotating element, and allowing the light to be projected on a photo detector to be used as light for measuring the displacement; the fifth step of causing a part of S-polarized light out of S-polarized light and P-polarized light obtained through the second polarization rotating element, which has been passed through the polarizing beam splitter, to pass through a lens and be reflected by the beam splitter, and then allowing the light to be projected on a position sensitive detector to be used as light for measuring the angular variations; and the sixth step of measuring the displacement of the measuring device or machining device moved by the stage by analyzing a phase difference between the reference light projected on the photo diode and the light for measuring the displacement, and measuring the angular variations of the measuring device or machining device in two directions by analyzing a position of the light projected on the position sensitive detector.

In addition, the present invention provides a method of simultaneously measuring a displacement and angular variations, including the first step of allowing light radiated from a single source to function as a point light source while passing through a pin hole, and then allowing a first part of light radiated from the point light source to be projected on a polarizing beam splitter through a beam splitter; the second step of causing P-polarized light out of S-polarized light and P-polarized light, which has been reflected by the polarizing beam splitter, to be converted into S-polarized light while being projected on and being reflected by a reference mirror through a quarter wave plate, allowing the S-polarized light to be projected on the polarizing beam splitter, causing the S-polarized light to be converted to P-polarized light while being returned from a corner cube, and being projected on and being reflected by the reference mirror through the polarizing beam splitter and a quarter wave plate, causing the P-polarized light to be converted into reference light having both an S-polarized light component and a P-polarized light component by a first polarization rotating element while being reflected by the polarizing beam splitter and passing through the first polarization rotating element; the third step of causing S-polarized light out of S-polarized light and P-polarized light, which has been passed through the polarizing beam splitter to be converted, into light having both an S-polarized light component and a P-polarized light component by a second polarization rotating element while being projected on and reflected by a stage mirror, which moves along with a stage, through the second polarization rotating element, and then allowing the first light to be projected on the polarizing beam splitter again; the fourth step of causing P-polarized light out of S-polarized light and P-polarized light obtained through the second polarization rotating element, which has been reflected by the polarizing beam splitter, to be converted into S-polarized light while being returned from a corner cube, being reflected by the polarizing beam splitter, and being projected on and reflected by a stage mirror through a quarter wave plate, causing the S-polarized light to be converted into light having both an S-polarized beam component and a P-polarized beam component by the first polarization rotating element while passing through the polarizing beam splitter and the first polarization rotating element, and allowing the light to be projected on a photo detector to be used as light for measuring the displacement; the fifth step of causing a second part of S-polarized light out of S-polarized light and P-polarized light obtained through the second polarization rotating element, which has been passed through the polarizing beam splitter, to pass through a lens and be reflected by the beam splitter, and then allowing the light to be projected on a position sensitive detector to be used as light for measuring the angular variations; and the sixth step of measuring the displacement of the measuring device or machining device moved by the stage by analyzing a phase difference between the reference light projected on the photo diode and the light for measuring the displacement, and measuring the angular variations of the measuring device or machining device in two directions by analyzing a position of the light projected on the position sensitive detector.

In the method, it is desirable that the polarization rotating element is a linear polarizer or an eighth wave plate.

In addition, the present invention provides an apparatus for simultaneously measuring a displacement and angular variations, constructed so that light radiated from a single light source can be projected along a single light axis on a stage mirror attached to a stage that moves a measuring device of a precision measuring apparatus or machining device of a machine tool, and so that a displacement and angular variations of the measuring device or the machining tool can be simultaneously measured by an interferometer for comparing light reflected by the stage mirror attached to the stage with light split from the light radiated from the single light source and returned from the mirror and analyzing them, and an autocollimator for analyzing an incident position of the light reflected by the stage mirror.

In addition, the present invention provides an apparatus for simultaneously measuring a displacement and angular variations, including a single light source; a pin hole for allowing light radiated from the single source to function as a point light source; a beam splitter for allowing a part of the light from the pin hole to be projected on a polarizing beam splitter, and allowing a part of the light passing through the polarizing beam splitter and returned from a stage mirror to be projected on a position sensitive detector so as to be used as light for measuring the angular variations; a polarizing beam splitter for passing S-polarized light out of the light projected from the beam splitter therethrough to the stage mirror, causing the S-polarized light to be converted into a light having both an S-polarized light component while being projected on and reflected by a stage mirror, allowing the S-polarized light out of the light to be projected on the beam splitter again, passing therethrough and P-polarized light out of the light to be reflected to and projected on a photo diode to be used as light for measuring the displacement while P-polarized light out of the light projected from the beam splitter is reflected to and projected on a reference mirror through a quarter wave plate as a reference light so as to be used for measuring the displacement; a quarter wave plate for converting the P-polarized light, which has been projected from the polarizing beam splitter and reflected by the reference mirror, into the S-polarized light; a second polarization rotating element for causing the S-polarized light, which has been passed through the polarizing beam splitter, to be converted into light having both an S-polarized light component and a P-polarized light component while being projected on and reflected by the stage mirror; a first polarization rotating element for converting the S-polarized light returned from the reference mirror and the P-polarized light returned from the stage mirror into light having both an S-polarized light component and a P-polarized component, and allowing the light to be projected on the photo diode so as to be used as light for measuring the distance; and analyzing and calculating means for measuring the displacement of the measuring device or machining device moved by a stage by analyzing a phase difference between the reference light projected on the photo diode and the light for measuring the displacement, and measuring the angular variations of the measuring device or machining device in two directions by analyzing a position of the light projected on the position sensitive detector.

In addition, the present invention provides an apparatus for simultaneously measuring a displacement and angular variations, including a single light source; a pin hole for allowing light radiated from the single source to function as a point light source; a beam splitter for allowing a part of the light projected on a polarizing beam splitter from the pin hole therethrough, passing through the polarizing beam splitter and allowing a part of the light returned from a stage mirror to be projected on a position sensitive detector so as to be used as light for measuring the angular variations; a polarizing beam splitter for allowing P-polarized light out of the light projected from the beam splitter to be reflected and passed to the first-corner cube, and allowing S-polarized light out of the light projected from the beam splitter to be transmitted and passed to the stage mirror; a first corner cube for reflecting the P-polarized light reflected by the polarizing beam splitter in a different path; a first polarization rotating element for converting the S-polarized light passed through the polarizing beam splitter into light having both an S-polarized light component and a P-polarized light component while being projected on and reflected by a stage mirror; a second corner cube for reflecting the P-polarized light reflected by the polarizing beam splitter to be returned to the stage mirror along a different path; a quarter wave plate for converting the second P-polarized light, which has been returned from the second corner cube and is projected on and reflected by the stage mirror, into S-polarized light; a second polarization rotating element for converting the P-polarized light returned from the second corner cube and reflected by the polarizing beam splitter and the S-polarized light returned from the stage mirror and passed through polarizing beam splitter into light having same linear polarization, and allowing the light having same linear polarization to be projected on a photo diode; and analyzing and calculating means for measuring the displacement of the measuring device or machining device moved by a stage by analyzing a phase difference between the reference light projected on the photo diode and the light for measuring the displacement, and measuring the angular variations of the measuring device or machining device in two directions by analyzing a position of the light projected on the position sensitive detector.

In addition, the present invention provides an apparatus for simultaneously measuring a displacement and angular variations, including a single light source; a pin hole for allowing light radiated from the single source to function as a point light source; a beam splitter for allowing a part of the light projected on a polarizing beam splitter from the pin hole therethrough, passing through the polarizing beam splitter and allowing a part of the light returned from a stage mirror to be projected on a position sensitive detector so as to be used as light for measuring the angular variations; a polarizing beam splitter for allowing P-polarized light out of the light projected from the beam splitter to be reflected and passed to a reference mirror, and allowing S-polarized light out of the light projected from the beam splitter to be transmitted and passed to the stage mirror; a first polarization rotating element for converting the S-polarized light, which has been passed through the polarizing beam splitter, into the light having both an S-polarized light component and a P-polarized light component while being projected on and reflected by the stage mirror; a corner cube for reflecting the P-polarized light, which has been reflected by the polarizing beam splitter, to be returned to the stage mirror in a different path, and reflecting the third S-polarized light, which has been returned from the reference mirror and then has passed through the polarizing beam splitter, to be returned to the reference mirror in a different path; a first quarter wave plate for converting the P-polarized light, which has been returned from the corner tube and then has been projected on and reflected by the stage mirror, into the S-polarized light; a second quarter wave plate for converting the P-polarized light, which has been reflected by the polarizing beam splitter, into the S-polarized light while being projected on and reflected by the reference mirror; a reference mirror for allowing the light passing through the second quarter wave plate to be reflected and passed to the polarizing beam splitter again after reflecting the polarizing beam splitter; a second polarization rotating element for converting the third P-polarized light, which has gone and returned between the reference mirror and the corner tube and then has been reflected by the polarizing beam splitter, and the S-polarized light, which has been returned from the stage mirror and then has been passed through polarizing beam splitter, into light having both an S-polarized light component and a P-polarized component, and allowing the light to be projected on a photo diode; and analyzing and calculating means for measuring the displacement of the measuring device or machining device moved by a stage by analyzing a phase difference between the reference light projected on the photo diode and the light for measuring the displacement, and measuring the angular variations of the measuring device or machining device in two directions by analyzing a position of the light projected on the position sensitive detector.

In the apparatus, it is desirable that the polarization rotating element is a linear polarizer or an eighth wave plate.

Further, it is desirable that the apparatus include a lens located in front of the beam splitter to convert the light, which has been radiated from the light source, into a collimated beam and to focus the light projected on the position sensitive detector.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
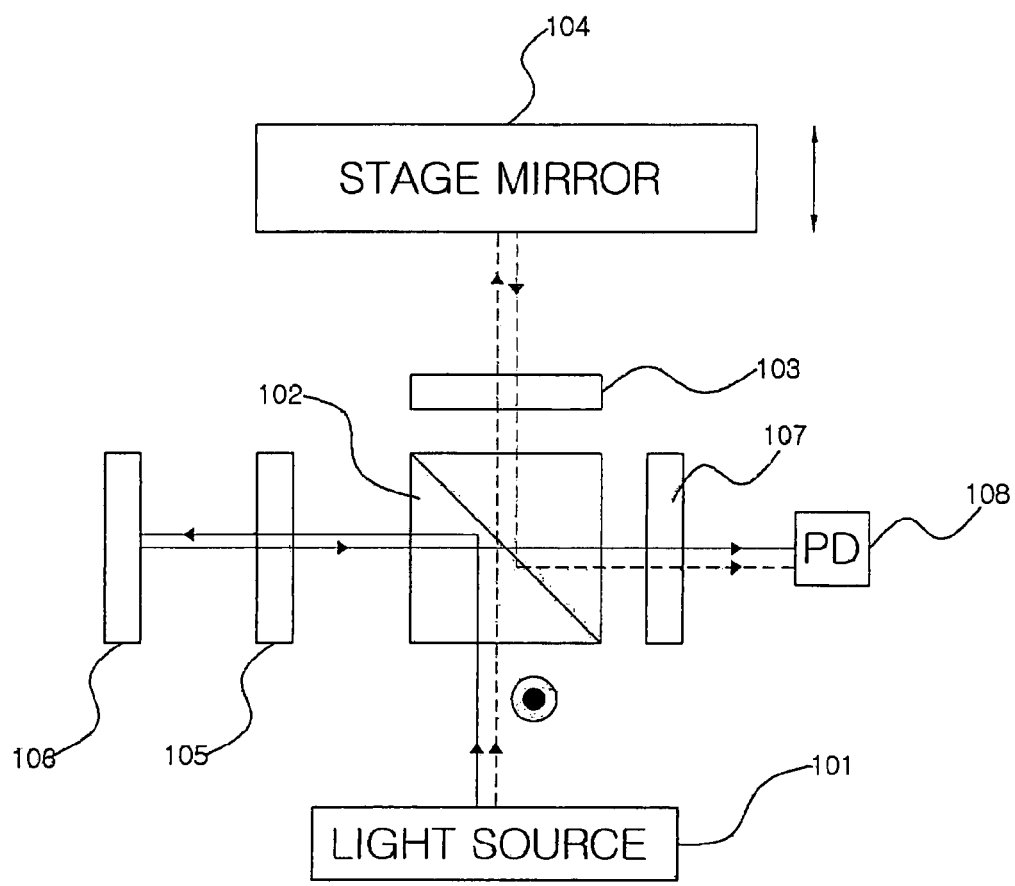
FIG. 1 is a diagram showing an example of Michelson interferometer for measuring a displacement.
Figure 2:
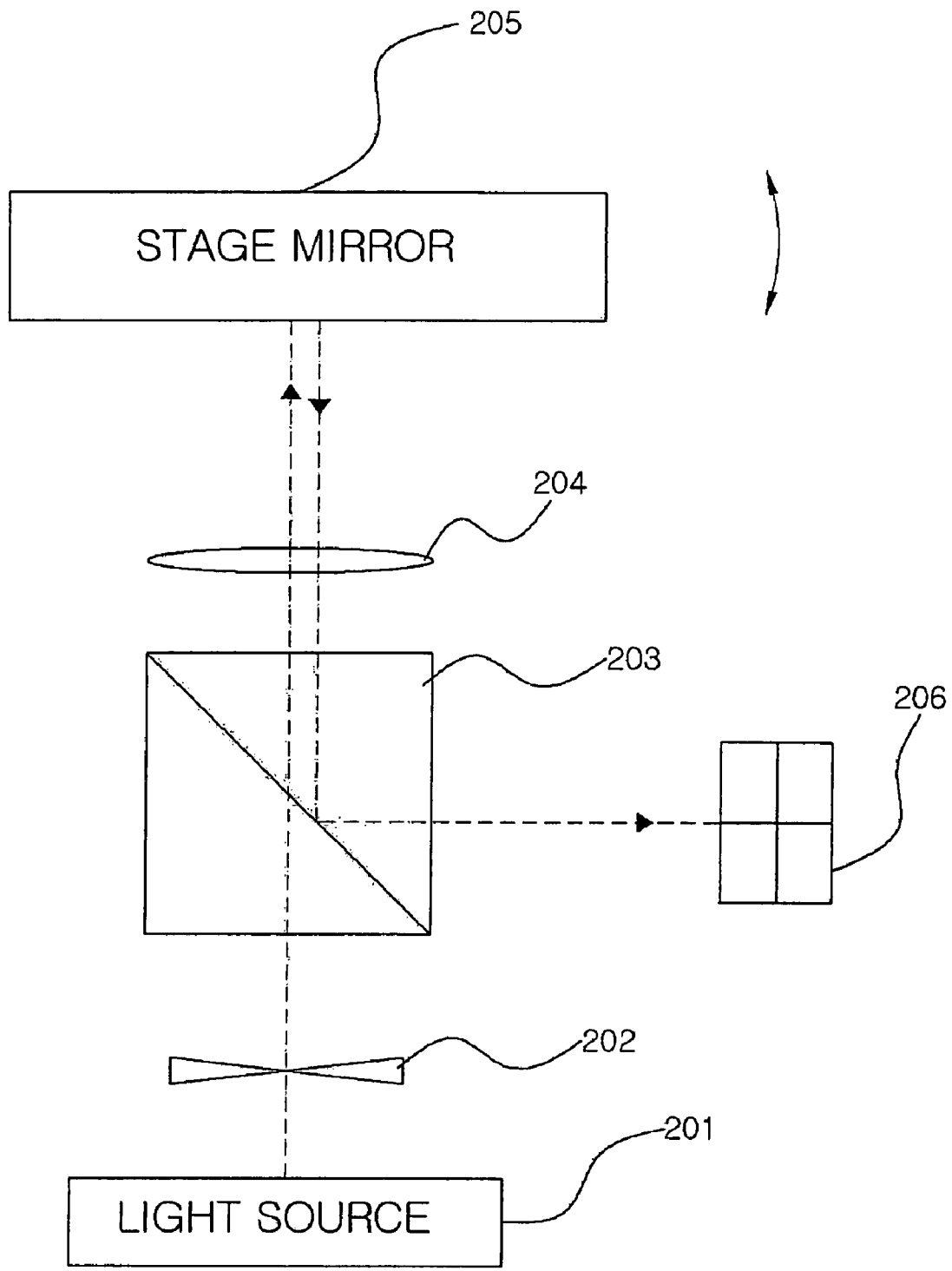
FIG. 2 is a schematic diagram showing an example of an autocollimator for measuring angular variations.

Reference now should be made to the drawings, in which the same reference numerals are used throughout the different drawings to designate the same or similar components.

Figure 3:
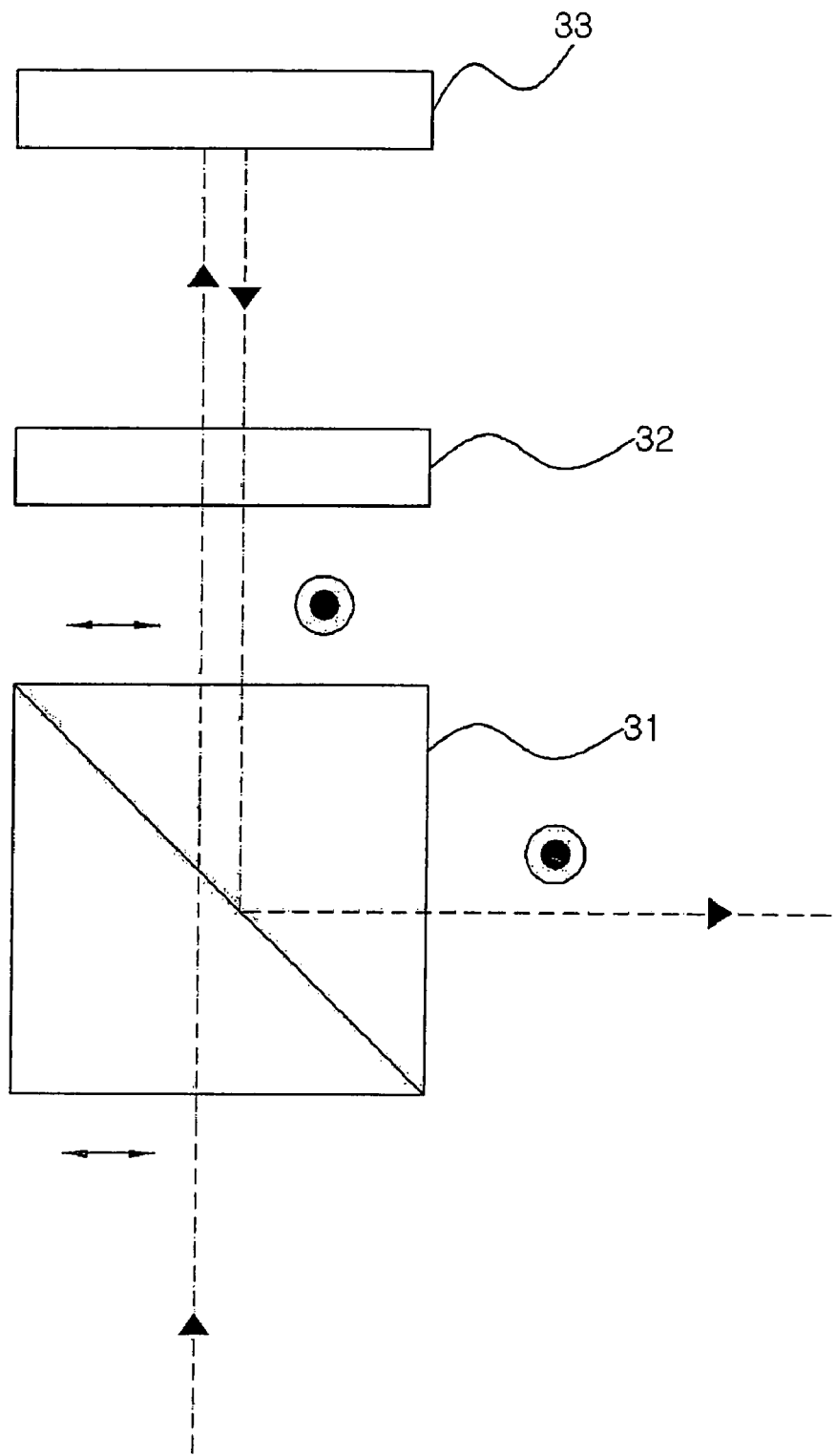
FIGS. 3 and 4 are diagrams showing the paths and polarization states of light passing through polarizing beam splitters when using a quarter wave plate and a linear polarizer in the Michelson interferometer of FIG. 1, respectively.

FIG. 3 is a schematic diagram showing a part of a Michelson interferometer that adopts a quarter wave plate.

The P-polarized light (laser beam) out of light radiated from a light source (not shown) and projected on a polarizing beam splitter 31 is reflected, and only the S-polarized light of the light is passed through the polarizing beam splitter 31. The light reflected on a stage mirror 33 in the form of circular polarized light is converted into P-polarized light having a direction perpendicular to that of the S-polarized light while passing through the quarter wave plate 32, and then is reflected by the polarizing beam splitter 31. According to this, in the Michelson interferometer equipped with a quarter wave plate 31, only the P-polarized light, which is transformed from the circular polarized light reflected on a stage mirror 33 by a quarter wave plate 31 and is reflected by the polarizing beam splitter, can be obtained.

In that case, the quarter wave plate 32 converts a linear polarized light into circular polarized light when the linear polarized light, such as P-polarized light or S-polarized light, passes through the quarter wave plate 32, and converts P-polarized light or S-polarized light into S-polarized light or P-polarized light each having a direction perpendicular to that of the original linear polarized light. In this case, the circular polarized light refers to polarized light in which a polarization vector is rotated in a circle around an origin and which repeats conversion of S-polarized light into P-polarized light and vice versa.

Figure 4:
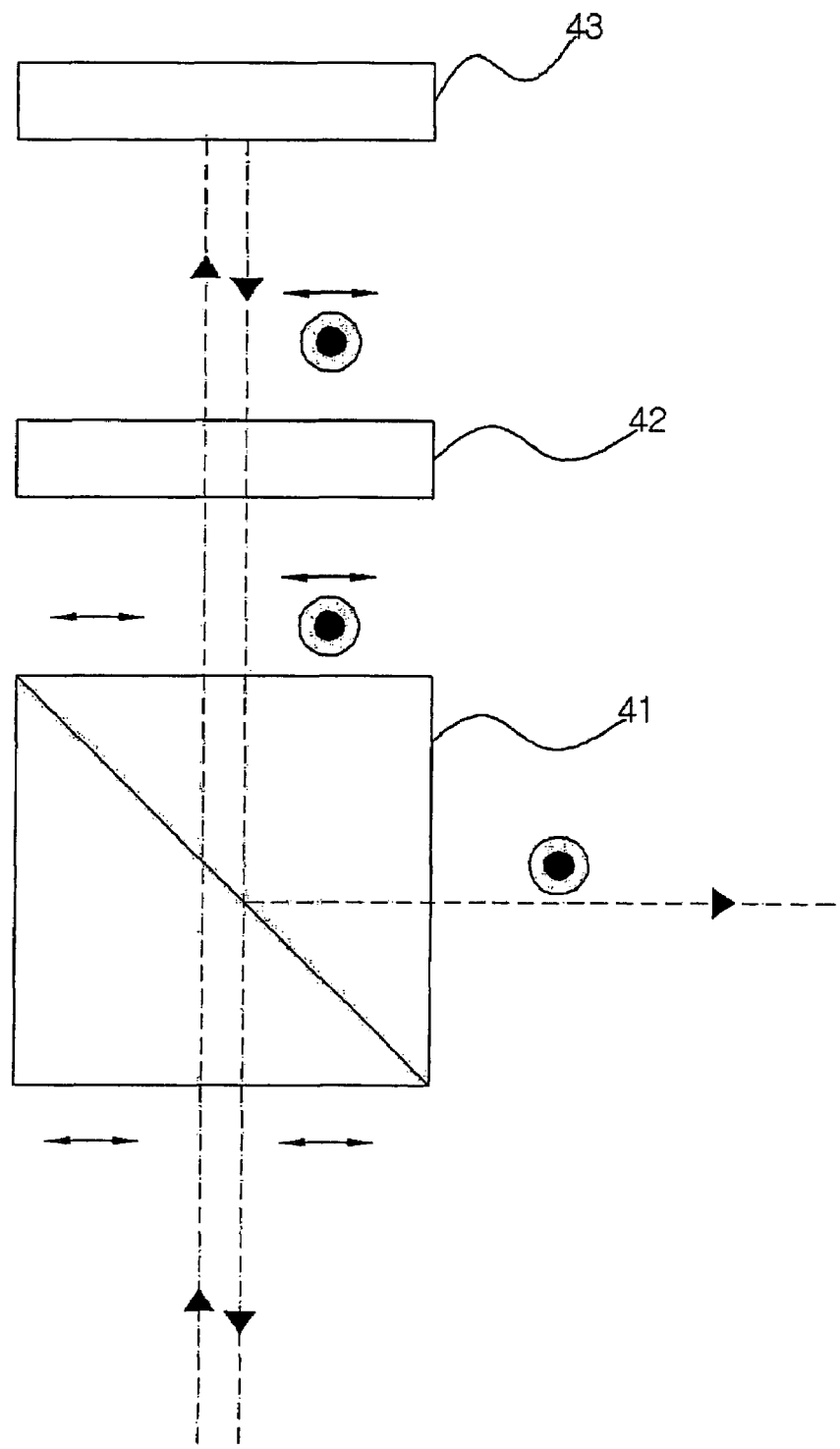

FIG. 4 is a schematic diagram showing the path of light having passed through a polarizing beam splitter when a linear polarizer is employed instead of the quarter wave plate in the Michelson interferometer of FIG. 3.

The P-polarized light (laser beam) out of light radiated from a light source (not shown) and projected on a polarizing beam splitter 41 is reflected, and only the S-polarized light out of the light is passed through the polarizing beam splitter 41 and is projected on a stage mirror 43 through a linear polarizer placed at an angle of 45°. The S-polarized light is converted into light having both an S-polarized light component an a P-polarized light component while passing through the linear polarizer 42, is reflected by the stage mirror 43, is passed through the linear polarizer 42, and is projected on the polarizing beam splitter 41.

Consequently, the Michelson interferometer equipped with the linear polarizer obtains both the P-polarized light reflected by the polarizing beam splitter 41 and the S-polarized light passed through the polarizing beam splitter 41.

In that case, the linear polarizer 42 has characteristics of passing S-polarized light therethrough and blocking P-polarized light at the state of being placed at an angle of 0°. When the linear polarizer 42 is placed at an angle of 45°, both S-polarized light and P-polarized light are produced regardless of whether incident light is S-polarized light or P-polarized light. However, the energy of the light passed through the linear polarizer 42 is reduced.

Figure 5:
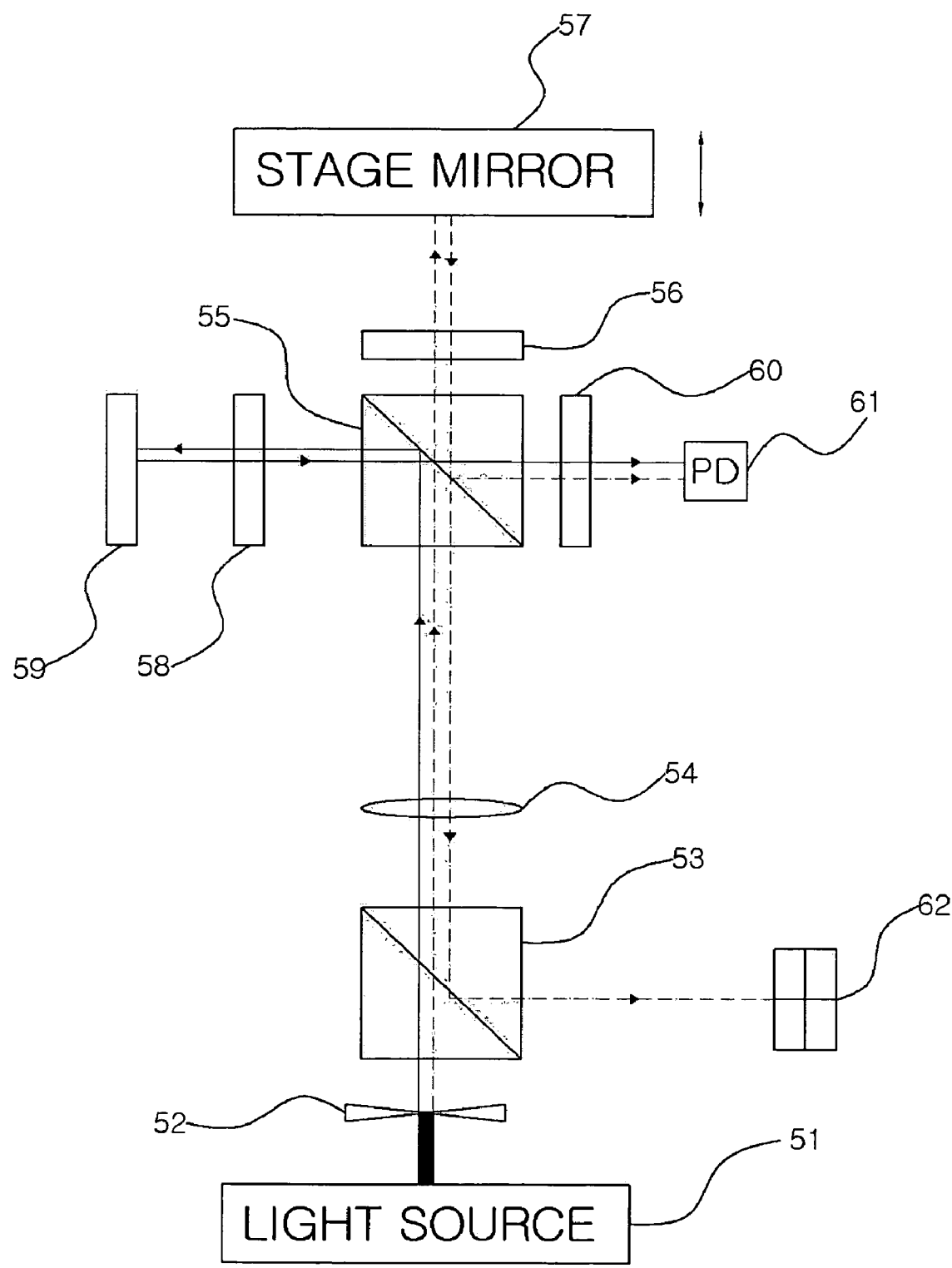
FIGS. 5 to 7 are diagrams showing apparatuses for simultaneously measuring displacements and angular variations in accordance with the present invention.

FIG. 5 is a schematic diagram showing a composite measuring apparatus that adopts a linear polarizer having characteristics as shown in FIG. 4 and is capable of simultaneously measuring a displacement and angular variations, in which a light axis for measuring the moving distance of a stage mirror based on the movement of a stage and a light axis for measuring the angular variations of a stage mirror are arranged to coincide with each other.

Light radiated from a light source 51 passes through a pin hole 52 located in front of the pin pole 52, and is projected on a beam splitter 53 in the form of light having both S-polarized light and P-polarized light. A part of the projected light is reflected by the beam splitter 53 (not shown), and the remaining part of the projected light is passed therethrough and is projected on a polarizing beam splitter 55 through a lens 54.

Since the energy of light is divided by the beam splitter 53 in a ratio of about 50 to 50, the light projected on the beam splitter 53 has energy corresponding to about 50% of that of the light radiated from the light source 51.

In that case, the lens 54 functions not only to convert light radiated from the light source 51 into a collimated beam but also to focus light reflected by the stage mirror 57 and returned to the position sensitive detector 62 on a single point at the position sensitive detector 62.

The P-polarized light out of the light passed through the beam splitter 53 is reflected by the polarizing beam splitter 55, passes through a quarter wave plate 58 and is projected on a reference mirror 59, while the S-polarized light out of the light passes through the polarizing beam splitter 55 and the linear polarizer 56 placed at an angle of 45° and is projected on a stage mirror 57.

In this case, the polarizing beam splitter 55 has the characteristics of passing only S-polarized light therethrough and blocking P-polarized light. When linear polarized light, such as S-polarized light or P-polarized light, passes through the quarter wave plate 58 once, the quarter wave plate 58 converts the linear polarized light into circular polarized light. Of course, when the circular polarized light passes through the quarter wave plate 58 once more, the quarter wave plate 58 converts the circular polarized light into linear polarized light, such as P-polarized light or S-polarized light opposite to the S-polarized light or the P-polarized light previously passed through the quarter wave plate 58. And this process is carried out repeatedly.

The P-polarized light, which was projected on the reference mirror 59 in the form of circular polarized light with the aid of the quarter wave plate 58 and is linear polarized light, is converted into S-polarized light having a perpendicularly converted direction while passing through the quarter wave plate 58 once more, is converted to light having both an S-polarized light component and a P-polarized light component by a linear polarizer 60 while passing through the polarizing beam splitter 55 and the linear polarizer 60, and is projected on a photo diode 61.

The light, which had both an S-polarized light component and a P-polarized light component with the aid of the linear polarizer 56 and was projected on the stage mirror 57, is reflected by the stage mirror 57, and is projected on the polarizing beam splitter 55 through the linear polarizer 56 again. The S-polarized light out of the light projected on the polarizing beam splitter 55 passes through the polarizing beam splitter 55, and the P-polarized light out of the light is reflected by the polarizing beam splitter 55, is converted into light having both an S-polarized light component and a P-polarized light component while passing through the linear polarizer 60, and is projected on the photo diode 61 to be used as light for measuring a distance.

The S-polarized light passed through the polarizing beam splitter 55 is divided by the beam splitter 53 through the lens 54, and divided beams are projected on the light source 51 and the position sensitive detector 62 respectively to be used as light for measuring angular variations.

In that case, the light projected on the position sensitive detector 62 is focused on a single point at the position sensitive detector 62 to accurately detect the position of the light directed by the lens 54.

Accordingly, a signal processing circuit (not shown) and a computer (not shown) connected to the photo diode 61 analyze the phase difference between the light reflected by the reference mirror 59 and the light reflected by the stage mirror 57, and thus can calculate the distance along which the measuring device of the precision measuring apparatus or machining device of the machine tool has moved with the aid of the stage. Furthermore, a signal processing circuit (not shown) and a computer (not shown) connected to the position sensitive detector 62 analyze the position of light projected on the position sensitive detector 62, and thus can calculate the angular variations of the measuring device of the precision measuring apparatus or machining device moved by the stage mirror (that is, the stage) of the machine tool in two directions.

Figure 6:
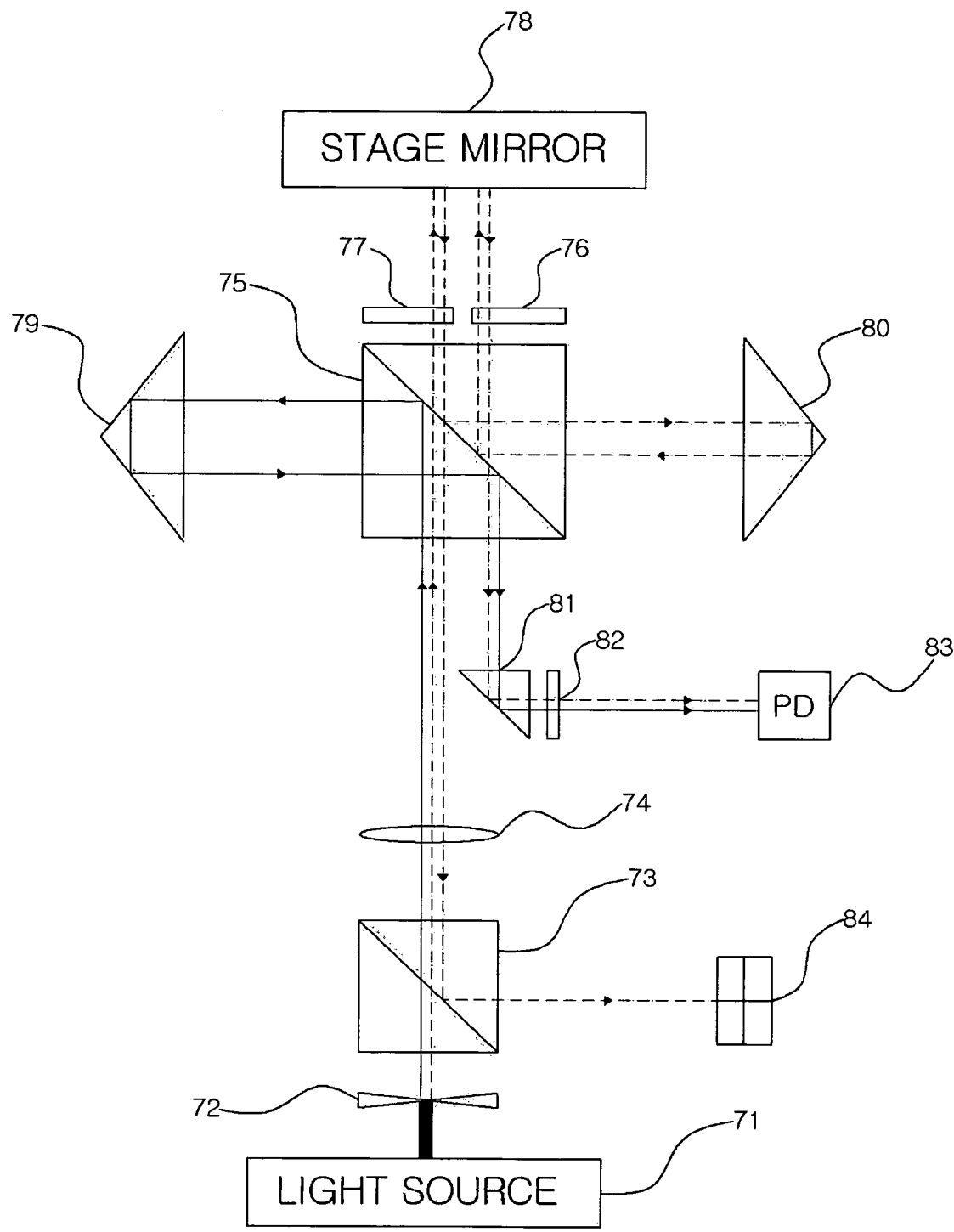

FIG. 6 is a schematic diagram showing another composite measuring apparatus that adopts a linear polarizer, a corner cube and a prism, in which light axes for measuring a distance and angular variations are aligned the same as in FIG. 5. Descriptions of elements identical with those of FIG. 5 are omitted below.

At first, light radiated from a light source 71 passes through a pin hole 52, and is projected on a beam splitter 73 in the form of light having both an S-polarized light component and a P-polarized light component. A part of the projected light is reflected by the beam splitter 73 (not shown), and the remaining part of the projected light passes through the beam splitter 73 and is projected on a polarizing beam splitter 75 through a lens 74.

Since the energy of light is divided by the beam splitter 73 in a ratio of about 50 to 50, the light having passed through the beam splitter 73 has energy corresponding to about 50% of that of the light radiated from the light source 71.

The P-polarized light of the light divided by the beam splitter 73 is reflected by the polarizing beam splitter 75, is returned from a fixed corner cube 79, and is projected on and is reflected by the polarizing beam splitter 75. The P-polarized light reflected by the polarizing beam splitter 75 is refracted by a prism 81, and is projected on a photo diode 83 in the form of light having both an S-polarized light component and a P-polarize light component through a linear polarizer 82 placed at an angle of 45° to be used as reference light for measuring a distance.

The S-polarized light of the light divided by the beam passes through the polarizing beam splitter 75 and the linear splitter 77 placed at an angle of 45°, and is projected on a stage mirror 78 moving along with a stage.

The light projected on the stage mirror 78 through the linear polarizer 77 in the form of light having both a S-polarized light component and a P-polarized light component is reflected by the stage mirror 78, and is projected on the polarizing beam splitter 75 through the linear polarizer 77. The S-polarized light of the light projected on the polarizing beam splitter 75 passes through the polarizing beam splitter 75, and the P-polarized light of the light is reflected by the polarizing beam splitter 75, is returned from a corner cube 80, is projected on the stage mirror 78 through a quarter wave plate 76 and is reflected by the stage mirror 78.

The light converted from the P-polarized light to the S-polarized light passes through the polarizing beam splitter 75, is refracted by the prism 81, is converted into light having an S-polarized light component and a P-polarized light component through the linear polarizer 82 placed at an angle of 45°, and is projected on the photo diode 83 to be used as light for measuring a distance.

It is apparent that the fact that the light for measuring a distance is gone and returned twice between the polarizing beam splitter 75 and the stage mirror 78 must be taken into consideration when calculating the distance, not as in the embodiment of FIG. 5.

The S-polarized light of the light having both an S-polarized light component and a P-polarized light component, which is obtained through the linear polarizer 77, passes through the polarizing beam splitter 75 and the lens 74, is divided by the beam splitter 73, and is projected on the light source 71 and the position sensitive detector 84 respectively to be used as light for measuring angular variations.

In that case, the light is projected on the position sensitive detector 84 while being focused on a single point to allow the position of the light projected through the lens 74 to be accurately detected.

Accordingly, a signal processing circuit (not shown) and a computer (not shown) connected to the photo diode 83 analyze the phase difference between the light returned from the corner cube 79 and refracted by the prism 81 and the light returned from the corner cube 80 and reflected by the stage mirror 78 twice, and thus can calculate the distance along which the measuring device of the precision measuring apparatus or machining device of the machine tool has moved with the aid of the stage. Furthermore, a signal processing circuit (not shown) and a computer (not shown) connected to the position sensitive detector 84 analyze the position of the light projected on the position sensitive detector 84, and thus can calculate the angular variations of the measuring device of the precision measuring apparatus or machining device of the machine tool has moved with the aid of the stage in two directions.

Figure 7:
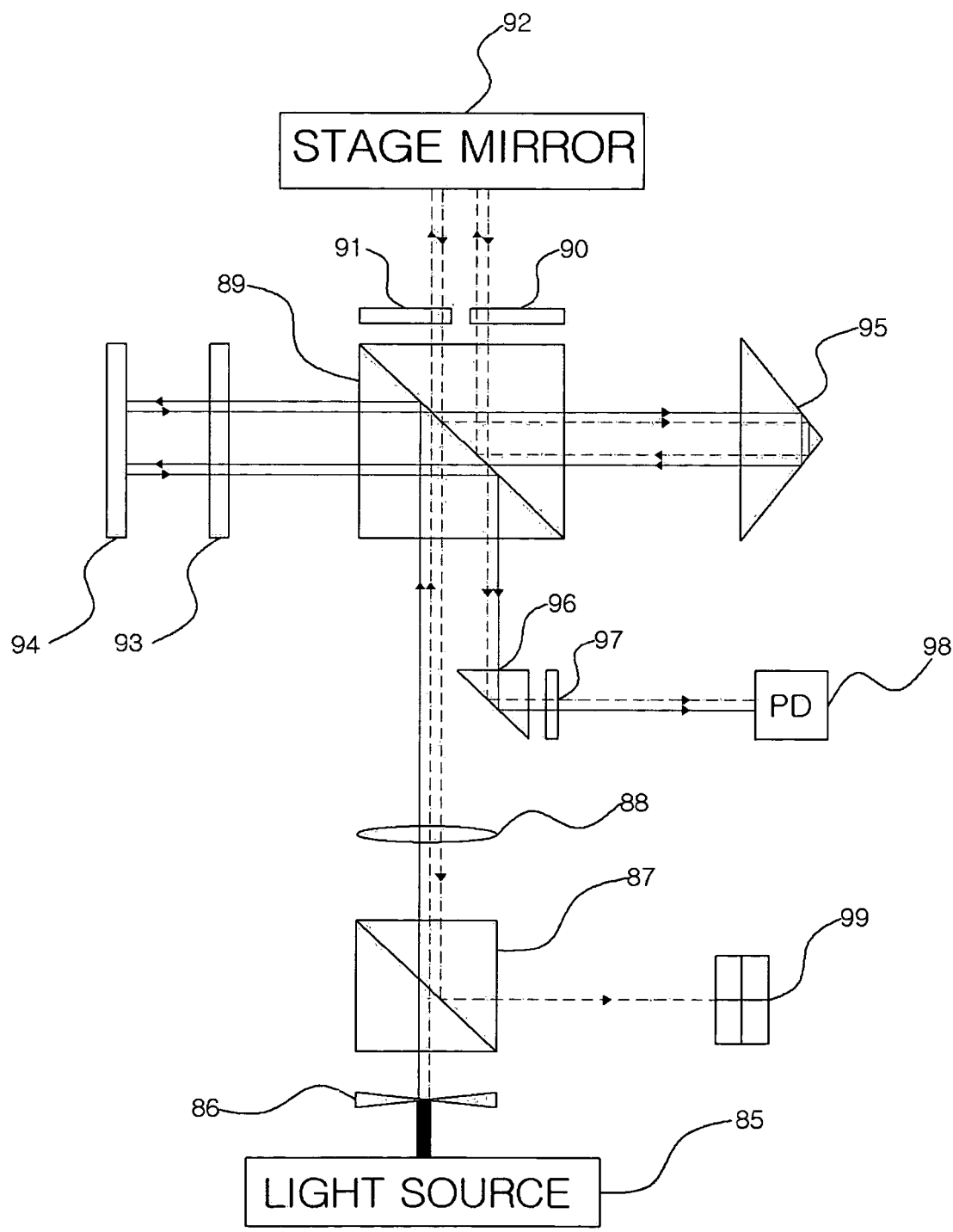

FIG. 7 is a schematic diagram showing a still another composite measuring apparatus that adopts a corner cube and a prism, in which light axes for measuring a distance and angular variations are aligned the same as in FIG. 5. Descriptions of elements identical with those of FIGS. 5 and 6 are omitted below.

At first, light radiated from a light source 85 passes through a pin hole 52, and is projected on a beam splitter 87 in the form of light having both an S-polarized light component and a P-polarized light component. A part of the projected light is reflected by the beam splitter 87 (not shown), and the remaining part of the projected light passes through the beam splitter 87 and is projected on a polarizing beam splitter 89 through a lens 88.

Since the energy of the light is divided by the beam splitter 87 in a ratio of about 50 to 50, the light having passed through the beam splitter 87 has about 50% of the energy corresponding to that of the light radiated from the light source 85.

The P-polarized light of the light divided by the beam splitter 85 is reflected by the polarizing beam splitter 89, passes through a quarter wave form 93 and is projected on a reference mirror 94, while the S-polarized light of the light passes through the polarizing beam splitter 89 and a linear polarizer 91 placed at an angle of 45° and is projected on a stage mirror 92 moving along with a stage.

The P-polarized light, which is linear polarized light and was projected on the reference mirror 94 through the quarter wave plate 93 in the form of circular polarized light, is converted into S-polarized light having a perpendicularly converted direction while passing through the quarter wave plate 93 again, passes through the polarizing beam splitter 89, is returned from a corner cube 95, and is projected on the polarizing beam splitter 89.

The S-polarized light returned from the corner cube 95 passes through the polarizing beam splitter 89 and the quarter wave plate 93, is projected on and reflected by the reference mirror 94, and is converted into P-polarized light by the polarizing beam splitter 89.

The P-polarized light projected on and reflected by the polarizing beam splitter 89 is refracted by a prism 96, passes through a linear polarizer 97 placed at an angle of 45° and is projected on a photo diode 98 in the form of light having both an S-polarized light component and a P-polarized light component to be used as reference light for measuring a distance.

The S-polarized light of the light divided by the beam splitter 87 passes through the polarizing beam splitter 89 and the linear polarizer 91 placed at an angle of 45°, and is projected on the stage mirror moving along with a stage.

The light projected on the linear polarizer 91 in the form of light having both an S-polarized light component and a P-polarized light component through the linear polarizer 91 is reflected by the stage mirror 92, and is projected on the polarizing beam splitter 89 through the linear polarizer 91. The S-polarized light out of the light projected on the polarizing beam splitter 89 passes through the polarizing beam splitter 89, while the P-polarized light out of the light is reflected by the polarizing beam splitter 89, is returned from the corner cube 95, is projected on the stage mirror 92 through a quarter wave plate 90, and is reflected by the stage mirror 92.

The light having been converted from P-polarized light to S-polarized light while having passing through the quarter wave plate 90 twice passes through the polarizing beam splitter 89, is refracted by the prism 96, is converted into light having both an S-polarized light component and a P-polarized light component, and is projected on a photo diode 98 to be used as light for measuring a distance.

It is apparent that the fact that the light for measuring a distance is gone and returned twice between the polarizing beam splitter 89 and the stage mirror 94 and between the polarizing beam splitter 89 and the stage mirror 92 must be taken into consideration to calculate the distance, not as in the embodiment of FIGS. 5 and 6.

The S-polarized light out of the light having both an S-polarized light component and a P-polarized light component, which is obtained through the linear polarizer 91, passes through the polarizing beam splitter 89 and the lens 88, is divided by the beam splitter 87, and is projected on the light source 85 and the position sensitive detector 99 respectively to be used as light for measuring angular variations.

In that case, the light is projected on the position sensitive detector 99 while being focused at a single point to allow the position of the light projected through the lens 88 to be accurately detected.

Accordingly, a signal processing circuit (not shown) and a computer (not shown) connected to the photo diode 95 analyze the phase difference between the light reflected by the reference mirror 94 twice and refracted by the prism 96 and the light returned from the corner cube 95 and reflected by the stage mirror 92 twice, and thus can calculate the distance along which the measuring device of the precision measuring apparatus or machining device of the machine tool has moved with the aid of the stage. Furthermore, a signal processing circuit (not shown) and a computer (not shown) connected to the position sensitive detector 84 analyze the position of the light projected on the position sensitive detector 84, and thus can calculate the angular variations of the measuring device of the precision measuring apparatus or machining device of the machine tool has moved with the aid of the stage in two directions.

Even though eighth wave plates instead of the linear polarizers of FIGS. 4 to 7 are employed, the same effect can be obtained. Such an eighth polarizer has a feature of converting linear polarized light into circular polarized light when the linear polarized light, such as S-polarized light or P-polarized light, has passed therethrough twice in the same manner as the quarter wave plate converts linear polarized light into circular light when the linear polarized light has passed through the quarter wave plate.

The present invention is not limited to the embodiments of FIGS. 5 to 7. Thus, a construction for allowing light radiated from a single light source to be projected on a stage mirror along a single light axis and analyzing the phases and locations of light reflected by the stage mirror and a part of the light radiated from the light source may be implemented in various ways other than the ways shown in FIGS. 5 to 7.

Accordingly, the method and apparatus for simultaneously measuring a displacement and angular variations provides the following effects.

1. The present invention allows a composite apparatus having the functions of a conventional laser interferometer and a conventional autocollimator to be constructed, so that the moving distance and rotation angles (yaw or pitch) of an object, such as the measuring device of a precision measuring apparatus or machining device of a machine tool, can be simultaneously measured.

2. Unlike the prior art in which a distance and angular variations are measured by a laser interferometer and an autocollimator, respectively, the present invention allows a displacement and the angular variations to be simultaneously measured, so that measuring time can be shortened and costs required for the purchase of instruments can be reduced.

3. The present invention allows a light axis for measuring a displacement and a light axis for measuring angular variations to coincide with each other, so that alignment is simply performed at the time of measuring a displacement and angular variations and an Abbe error can be avoided, and the present invention allows light radiated from a single light source to be used as light for measuring both the displacement and the angular variations, so that manufacturing and maintenance costs can be reduced.

4. The present invention allows a displacement and angular variations to be simultaneously measured by a single apparatus, the displacement and angular variations of the stage can be detected in real time, and an apparatus for correcting a machining error generated during the machining of a stage can be constructed, thus improving the performance of the stage.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of simultaneously measuring a relative displacement and angular variations of a measuring device and a machining device, the machining device being moved by a stage having a stage mirror, comprising:

a first step of allowing light radiated from a single source to function as a point light source while passing through a pin hole, and then allowing a part of the light radiated from the point light source to be projected on a polarizing beam splitter after passing through a first beam splitter, said light including a first S-polarized light component and a first P-polarized light component, said first P-polarized light component being reflected by the polarizing beam splitter and said first S-polarized light component passing through the polarizing beam splitter;

a second step of causing said first P-polarized light component, which has been reflected by the polarizing beam splitter, to be converted into reflected S-polarized light while being projected on and being reflected by a reference mirror through a quarter wave plate; causing the reflected S-polarized light to be converted into reference light having both a reference S-polarized light component and a reference P-polarized light component by a first polarization rotating element while passing through the polarizing beam splitter and the first polarization rotating element; and then allowing the reference light to be projected on a photo diode;

a third step of causing said first S-polarized light component, which has passed through the polarizing beam splitter, to be converted into transmitted light having both a second S-polarized light component and a second P-polarized light component by a second polarization rotating element; causing said transmitted light to be projected on and reflected by said stage mirror, which moves along with said stage; causing said transmitted light to pass through the second polarization rotating element, and then allowing the transmitted light to be projected on the polarizing beam splitter again;

a fourth step of causing the second P-polarized light component of the transmitted light to be reflected by the polarizing beam splitter and converted into displacement measuring light having both a third P-polarized light component and a third S-polarized light component by the first polarization rotating element, and then allowing the light to be projected on said photo diode to be used as displacement measuring light for measuring the relative displacement between said measuring device and said machining device;

the fifth step of causing the second S-polarized light component, which has again passed through the polarizing beam splitter, to pass through a lens and be reflected by the first beam splitter, and then allowing the second S-polarized light component to be projected on a position sensitive detector to be used as angular variation measuring light for measuring the angular variations between said measuring device and said machining device;

the sixth step of measuring the relative displacement between the measuring device and the machining device moved by the stage by analyzing a phase difference between the reference light projected on the photo diode and the distance measuring light also projected on the photo diode, and measuring the angular variations between the measuring device and the machining device in two directions by analyzing a position of the angular variation measuring light projected on the position sensitive detector.

2. A method of simultaneously measuring a relative displacement and angular variations of a measuring device and a machining device, the machining device being moved by a stage having a stage mirror, comprising:

a first step of allowing light radiated from a single source to function as a point light source while passing through a pin hole, and then allowing a part of the light radiated from the point light source to be projected on a polarizing beam splitter after passing through a first beam splitter, said light including a first S-polarized light component and a first P-polarized light component, said first P-polarized light component being reflected by the polarizing beam splitter and said first S-polarized light component passing through the polarizing beam splitter;

a second step of causing said first P-polarized light component, which has been reflected by the polarizing beam splitter, to be converted into reference light having both a reference S-polarized light component and a reference P-polarized light component by a first polarization rotating element after being returned from a first corner cube, reflected by the polarizing beam splitter again, and passing through the first polarization rotating element, and then allowing the reference light to be projected on a photo diode;

a third step of causing said first S-polarized light component, which has passed through the polarizing beam splitter, to be converted into transmitted light having both a second S-polarized light component and a second P-polarized light component by a second polarization rotating element; causing said transmitted light to be projected on and reflected by said stage mirror, which moves along with said stage; causing said transmitted light to pass through the second polarization rotating element, and then allowing the transmitted light to be projected on the polarizing beam splitter again;

a fourth step of causing the second P-polarized light component of the transmitted light to be reflected by the polarizing beam splitter and converted into third S-polarized light after being returned from a second corner cube, reflected by the polarizing beam splitter, and again projected on and reflected by said stage mirror through a quarter wave plate; and causing the third S-polarized light to be converted into displacement measuring light having both fourth S-polarized beam component and a P-polarized beam component by the first polarization rotating element; and allowing the light to be projected on said photo diode to be used as light for measuring the relative displacement between said measuring device and said machining device;

the fifth step of causing the second S-polarized light component, which has again passed through the polarizing beam splitter, to pass through a lens and be reflected by the first beam splitter, and then allowing the second S-polarized light component to be projected on a position sensitive detector to be used as angular variation measuring light for measuring the angular variations between said measuring device and said machining device;

the sixth step of measuring the relative displacement between the measuring device and the machining device moved by the stage by analyzing a phase difference between the reference light projected on the photo diode and the distance measuring light also projected on the photo diode, and measuring the angular variations between the measuring device and the machining device in two directions by analyzing a position of the angular variation measuring light projected on the position sensitive detector.

3. A method of simultaneously measuring a relative displacement and angular variations of a measuring device and a machining device, the machining device being moved by a stage having a stage mirror, comprising:

a first step of allowing light radiated from a single source to function as a point light source while passing through a pin hole, and then allowing a part of the light radiated from the point light source to be projected on a polarizing beam splitter after passing through a first beam splitter, said light including a first S-polarized light component and a first P-polarized light component, said first P-polarized light component being reflected by the polarizing beam splitter and said first S-polarized light component passing through the polarizing beam splitter;

a second step of causing said first P-polarized light component, which has been reflected by the polarizing beam splitter, to be converted into reflected S-polarized light while being projected on and reflected by a reference mirror through a first quarter wave plate, allowing the reflected S-polarized light to be converted to reflected P-polarized light while being returned from a corner cube, and again projected on and reflected by the reference mirror through the polarizing beam splitter and said first quarter wave plate; and causing the reflected P-polarized light to be converted into reference light having both a reference S-polarized light component and a reference P-polarized light component by a first polarization rotating element while being reflected by the polarizing beams splitter and passing through the first polarization rotating element;

a third step of causing said first S-polarized light component, which has passed through the polarizing beam splitter, to be converted into transmitted light having both a second S-polarized light component and a second P-polarized light component by a second polarization rotating element; causing said transmitted light to be projected on and reflected by said stage mirror, which moves along with said stage; causing said transmitted light to pass through the second polarization rotating element, and then allowing the transmitted light to be projected on the polarizing beam splitter again;

a fourth step of causing the second P-polarized light component of the transmitted light to be reflected by the polarizing beam splitter and converted into third S-polarized light after being returned from said corner cube, reflected by the polarizing beam splitter, and again projected on and reflected by said stage mirror through a second quarter wave plate; and causing the third S-polarized light to be converted into displacement measuring light having both fourth S-polarized beam component and a P-polarized beam component by the first polarization rotating element; and allowing the light to be projected on said photo diode to be used as displacement measuring light for measuring the relative displacement between said measuring device and said machining device;

the fifth step of causing the second S-polarized light component, which has again passed through the polarizing beam splitter, to pass through a lens and be reflected by the first beam splitter, and then allowing the second S-polarized light component to be projected on a position sensitive detector to be used as angular variation measuring light for measuring the angular variations between said measuring device and said machining device;

the sixth step of measuring the relative displacement between the measuring device and the machining device moved by the stage by analyzing a phase difference between the reference light projected on the photo diode and the distance measuring light also projected on the photo diode, and measuring the angular variations between the measuring device and the machining device in two directions by analyzing a position of the angular variation measuring light projected on the position sensitive detector.

4. The method as set forth in any of claims 1 to 3, wherein at least one of the first polarization rotating element and the second polarization rotating element is a linear polarizer or an eighth wave plate.

5. An apparatus for simultaneously measuring a relative displacement and angular variations between a measuring device and a machining device moved on a stage, the stage having a stage mirror, comprising:

a single light source;

a pin hole for allowing light radiated from the single source to function as a point light source;

a polarizing beam splitter;

a first beam splitter for allowing a part of the light from the pin hole to be projected on the polarizing beam splitter, and allowing angular position measuring light passing through the polarizing beam splitter to be projected on a position sensitive detector, said light from the pin hole including a first S-polarized light component and a first P-polarized light component, said first P-polarized light component being reflected by the polarizing beam splitter and said first S-polarized light component passing through the polarizing beam splitter;

a quarter wave plate;

a first polarization rotating element;

a second polarization rotating element;

a photo diode;

a position sensitive detector; and analyzing and calculating means for measuring the relative displacement between the measuring device and the machining device moved by the stage by analyzing a phase difference between the reference light projected on the photo diode and the displacement measuring light also projected on the photo diode, and measuring the relative angular variations between the measuring device and the machining device in two directions by analyzing a position of the angular variation measuring light projected on the position sensitive detector, wherein said first P-polarized light is converted into reflected S-polarized light while being projected on and reflected by said reference mirror through said quarter wave plate, causing the reflected S-polarized light to be converted into reference light having both a reference S-polarized light component and a reference P-polarized light component by said first polarization rotating element while passing though the polarizing beam splitter and the first polarization rotating element, the reference light being projected on said photo diode;

wherein said first S-polarized light component is converted into transmitted light having both a second S-polarized light component and a second P-polarized light component by a second polarization rotating element, said transmitted light is projected on and reflected by said stage mirror, which moves along with said stage, and said transmitted light is further caused to pass through the second polarization rotating element and then projected on the polarizing beam splitter again;

wherein the second P-polarized light component of the transmitted light is reflected by the polarizing beam splitter and converted into displacement measuring light having both a third P-polarized light component and a third S-polarized light component by the first polarization rotating element, and then projected on said photo diode to be used as displacement measuring light for measuring the relative displacement between said measuring device and said machining device; and wherein the second P-polarized light component, which passes back through the polarizing beam splitter after reflection from the stage mirror before being projected by the first beam splitter on said position sensitive detector to be used as said angular variation measuring light.

6. An apparatus for simultaneously measuring a relative displacement and angular variations between a measuring device and a machining device moved on a stage, the stage having a stage mirror, comprising:

a single light source;
a pin hole for allowing light radiated from the single source to function as a point light source;
a polarizing beam splitter;
a first beam splitter for allowing a part of the light from the pin hole to be projected on the polarizing beam splitter, and allowing angular position measuring light passing through the polarizing beam splitter to be projected on a position sensitive detector, said light from the pin hole including a first S-polarized light component and a first P-polarized light component, said first P-polarized light component being reflected by the polarizing beam splitter and said first S-polarized light component passing through the polarizing beam splitter;
a first corner cube;
a first polarization rotating element;
a second corner cube;
a second polarization rotating element;
a quarter wave plate;
a photo diode;
a position sensitive detector; and
analyzing and calculating means for measuring the relative displacement between the measuring device and the machining device moved by the stage by analyzing a phase difference between the reference light projected on the photo diode and the displacement measuring light also projected on the photo diode, and measuring the relative angular variations between the measuring device and the machining device in two directions by analyzing a position of the angular variation measuring light projected on the position sensitive detector,
wherein said first P-polarized light, which has been reflected by the polarizing beam splitter, is converted into reference light having both a reference S -polarized light component and a reference P-polarized light component by said first polarization rotating element after being returned from said first corner cube, reflected by the polarizing beam splitter again, and passed through the first polarization rotating element, and then is projected on a photo diode;
wherein said first S-polarized light component, which has passed through the polarizing beam splitter, is converted into transmitted light having both a second S-polarized light component and a second P-polarized light component by a second polarization rotating element, said transmitted light being projected on and reflected by said stage mirror, which moves along with said stage, and then projected on the polarizing beam splitter again;
wherein the second P-polarized light component of the transmitted light is reflected by the polarizing beam splitter and converted into third S-polarized light after being returned from a second corner cube, reflected by the polarizing beam splitter, and again projected on and reflected by said stage mirror through said quarter wave plate, the third S-polarized light being converted by the first polarization rotating element into displacement measuring light having both a fourth S-polarized beam component and a P-polarized beam component and projected on said photo diode to be used as displacement measuring light for measuring the relative displacement between said measuring device and said machining device, and
wherein the second S-polarized light component, which passes back through the polarizing beam splitter after reflection from the stage mirror before being projected by the first beam splitter on said position sensitive detector to be used as said angular variation measuring light.

7. An apparatus for simultaneously measuring a relative displacement and angular variations between a measuring device and a machining device moved on a stage, the stage having a stage mirror, comprising:

a single light source;
a pin hole for allowing light radiated from the single source to function as a point light source;
a polarizing beam splitter;
a first beam splitter for allowing a part of the light from the pin hole to be projected on the polarizing beam splitter, and allowing angular position measuring light passing through the polarizing beam splitter to be projected on a position sensitive detector, said light from the pin hole including a first S-polarized light component and a first P-polarized light component, said first P-polarized light component being reflected by the polarizing beam splitter and said first S-polarized light component passing through the polarizing beam splitter;
a first polarization rotating element;
a corner cube;
a second polarization rotating element;
a first quarter wave plate;
a second quarter wave plate;
a reference mirror;
a photo diode;
a position sensitive detector; and
analyzing and calculating means for measuring the relative displacement between the measuring device and the machining device moved by the stage by analyzing a phase difference between the reference light projected on the photo diode and the displacement measuring light also projected on the photo diode, and measuring the relative angular variations between the measuring device and the machining device in two directions by analyzing a position of the angular variation measuring light projected on the position sensitive detector,
wherein said first P-polarized light component, which has been reflected by the polarizing beam splitter, is converted into reflected S-polarized light while being projected on and reflected by said reference mirror through said quarter wave plate, then converted into reflected P-polarized light while being returned from said corner cube, and again projected on and reflected by the reference mirror through the polarizing beam splitter and said quarter wave plate, the reflected P-polarized light being converted into reference light having both a reference S-polarized light component and a reference P-polarized light component by said first polarization rotating element while being reflected by the polarizing beams splitter and passing through the first polarization rotating element;
wherein said first S-polarized light component, which has passed through the polarizing beam splitter, is converted into transmitted light having both a second S-polarized light component and a second P-polarized light component by a second polarization rotating element, said transmitted light being projected on and reflected by said stage mirror, which moves along with said stage, passed through the second polarization rotating element, and then projected on the polarizing beam splitter again, the second P-polarized light component being again reflected by the polarizing beam splitter and converted into third S-polarized light after being returned from said corner cube, reflected by the polarizing beam splitter, and again projected on and reflected by said stage mirror through said second quarter wave plate, said third S-polarized light being converted into displacement measuring light having both a fourth S-polarized beam component and a P-polarized beam component by the first polarization rotating element, said displacement measuring light being projected on said photo diode to be used as displacement measuring light for measuring the relative displacement between said measuring device and said machining device, and wherein the second S-polarized light component, which passes back through the polarizing beam splitter after reflection from the stage mirror before being projected by the first beam splitter on said position sensitive detector to be used as said angular variation measuring light.

8. The apparatus as set forth in any of claims 5 to 7, wherein at least one of the first polarization rotating element and the second polarization rotating element is a linear polarizer or an eight wave plate.

9. The apparatus as set forth in claim 6 or claim 7, further comprising a lens located in front of the first beam splitter to convert the light radiated from the light source into a collimated beam, and to focus the angular variation measuring light projected on the position sensitive detector.

* * * * *